United States Patent
Jales Costa et al.

(10) Patent No.: US 10,290,158 B2
(45) Date of Patent: May 14, 2019

(54) SYSTEM AND METHOD FOR ASSESSING THE INTERIOR OF AN AUTONOMOUS VEHICLE

(71) Applicant: Ford Global Technologies, LLC, Dearborn, MI (US)

(72) Inventors: Bruno Sielly Jales Costa, Sunnyvale, CA (US); Madeline J Goh, Palo Alto, CA (US); Jinesh J Jain, Palo Alto, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/424,309

(22) Filed: Feb. 3, 2017

(65) Prior Publication Data

US 2018/0225890 A1    Aug. 9, 2018

(51) Int. Cl.
*G07C 5/00* (2006.01)
*G07C 9/00* (2006.01)
(Continued)

(52) U.S. Cl.
CPC ............ *G07C 5/006* (2013.01); *B60S 5/00* (2013.01); *G05D 1/0088* (2013.01);
(Continued)

(58) Field of Classification Search
CPC . G07C 5/00; G07C 5/006; G05D 1/00; G05D 1/0088; B60S 5/00; G06K 9/00;
(Continued)

(56) References Cited

U.S. PATENT DOCUMENTS 6,005,958 A * 12/1999 Farmer ................. B60N 2/002
                                                340/438
6,781,676 B2 * 8/2004 Wallace ................... G01C 3/08
                                                250/221
(Continued)

FOREIGN PATENT DOCUMENTS

CN    202422205 U    9/2012
CN    202448860 U    9/2012
(Continued)

OTHER PUBLICATIONS

2012 FLIR Systems, Inc. Specifications are subject to change without notice, check our website: www.flir.com/Maritime, 1005-398 v.2.
(Continued)

*Primary Examiner* — Yonel Beaulieu
(74) *Attorney, Agent, or Firm* — David R. Stevens; Stevens Law Group

(57) ABSTRACT

An autonomous vehicle includes interior sensors including an IR camera and a visible light camera. Images of an interior of the vehicle are captured using the cameras both before and after a passenger rides in the vehicle. The IR images from before and after are subtracted to obtain a difference image. Pixels above a threshold intensity a clustered. Clusters having an above-threshold size are determined to be anomalies. Portions of images from the visible light camera corresponding to the anomalies are sent to a dispatcher, who may then clear the vehicle to pick up another passenger or proceed to a cleaning station. Anomalies may be identified based on a combination of the IR images and visible light images.

18 Claims, 6 Drawing Sheets

(51) Int. Cl.
*B60S 5/00* (2006.01)
*G05D 1/00* (2006.01)
*G06T 7/00* (2017.01)
*G08G 1/00* (2006.01)
*H04N 5/00* (2011.01)
*H04N 5/33* (2006.01)
*G06K 9/00* (2006.01)
*G06K 9/62* (2006.01)

(52) U.S. Cl.
CPC ....... *G06K 9/00832* (2013.01); *G06K 9/6212* (2013.01); *G06T 7/0002* (2013.01); *G08G 1/202* (2013.01); *H04N 5/33* (2013.01); *G05D 2201/0212* (2013.01); *G06T 2207/10048* (2013.01); *G06T 2207/20224* (2013.01); *G06T 2207/30268* (2013.01)

(58) Field of Classification Search
CPC .... G06K 9/00832; G06K 9/6212; H04N 5/33; G08G 1/202
See application file for complete search history.

(56) References Cited

U.S. PATENT DOCUMENTS

| | | | |
|---|---|---|---|
| 7,027,621 B1* | 4/2006 | Prokoski | G06K 9/00248 180/272 |
| 7,262,696 B2 | 8/2007 | Aota | |
| 7,596,242 B2 | 9/2009 | Breed | |
| 8,098,302 B2 | 1/2012 | Fukuda | |
| 8,416,397 B2 | 4/2013 | Balzer | |
| 9,128,185 B2 | 9/2015 | Zeng | |
| 9,444,770 B1* | 9/2016 | Ledet | G06F 17/30699 |
| 9,488,982 B2 | 11/2016 | Gurin | |
| 9,760,827 B1* | 9/2017 | Lin | G06N 3/063 |
| 2004/0245467 A1 | 12/2004 | Lannestedt | |
| 2005/0024494 A1* | 2/2005 | Hirota | B60R 1/00 348/148 |
| 2005/0131625 A1 | 6/2005 | Birger | |
| 2005/0276464 A1 | 12/2005 | Duquette | |
| 2006/0091310 A1 | 5/2006 | Furry | |
| 2008/0036580 A1* | 2/2008 | Breed | B60R 21/01536 340/438 |
| 2009/0039255 A1 | 2/2009 | Andrews et al. | |
| 2009/0040778 A1* | 2/2009 | Takayanagi | B60R 1/00 362/494 |
| 2009/0208083 A1 | 8/2009 | Hayes | |
| 2013/0010096 A1* | 1/2013 | S. | A61B 3/113 348/78 |
| 2014/0160434 A1 | 6/2014 | Brown | |
| 2014/0163329 A1 | 6/2014 | Brown | |
| 2015/0116315 A1 | 4/2015 | Takemoto | |
| 2015/0199619 A1 | 7/2015 | Ichinose | |
| 2015/0213299 A1 | 7/2015 | Solano Ferrandez | |
| 2015/0323388 A1 | 11/2015 | Kostic | |
| 2016/0078576 A1 | 3/2016 | Su | |
| 2016/0140392 A1 | 5/2016 | Gurbuz | |
| 2016/0328976 A1* | 11/2016 | Jo | F02D 41/403 |
| 2016/0332535 A1 | 11/2016 | Bradley | |
| 2017/0091559 A1* | 3/2017 | Hurtado | H04N 7/181 |
| 2017/0136842 A1* | 5/2017 | Anderson | B60G 17/016 |
| 2017/0174180 A1* | 6/2017 | Hoyos | B60R 25/25 |
| 2017/0210352 A1 | 7/2017 | Stauffer | |
| 2017/0210353 A1 | 7/2017 | Stauffer | |
| 2017/0267251 A1* | 9/2017 | Roberts | B60W 40/08 |
| 2017/0291548 A1* | 10/2017 | Kim | B60R 1/00 |
| 2017/0330044 A1 | 11/2017 | Telpaz | |
| 2017/0353681 A1 | 12/2017 | Mochizuki | |
| 2018/0022358 A1* | 1/2018 | Fung | G06K 9/00536 701/36 |
| 2018/0112173 A1 | 4/2018 | Wiles | |

FOREIGN PATENT DOCUMENTS

| | | |
|---|---|---|
| CN | 202871022 U | 4/2013 |
| CN | 203224912 U | 10/2013 |
| CN | 104597857 A | 5/2015 |
| CN | 104601937 A | 5/2015 |
| DE | 102012007559 A1 | 11/2012 |
| DE | 102013001332 | 7/2014 |
| GB | 2543161 | 4/2017 |
| GB | 2558722 | 7/2018 |
| JP | H06273255 A | 9/1994 |
| JP | 2011105415 A | 6/2011 |
| WO | WO-2005001409 A2 | 1/2005 |
| WO | 2015025435 | 2/2015 |

OTHER PUBLICATIONS

Track Buses in Real Time with SBU Smart Transit, SBU Happenings, Mar. 16, 2012.

* cited by examiner

SYSTEM AND METHOD FOR ASSESSING THE INTERIOR OF AN AUTONOMOUS VEHICLE

BACKGROUND

Field of the Invention

This invention relates to a sensor system and method for an autonomous vehicle.

Background of the Invention

Autonomous vehicles are the subject of much research and development. Such vehicles include a set of sensors and control logic that enables the identification and avoidance of obstacles and navigation to a destination. One application of autonomous vehicles is use as taxis that can pick up a passenger on demand.

The system and methods disclosed herein provide an approach for providing autonomous taxi services.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1A:
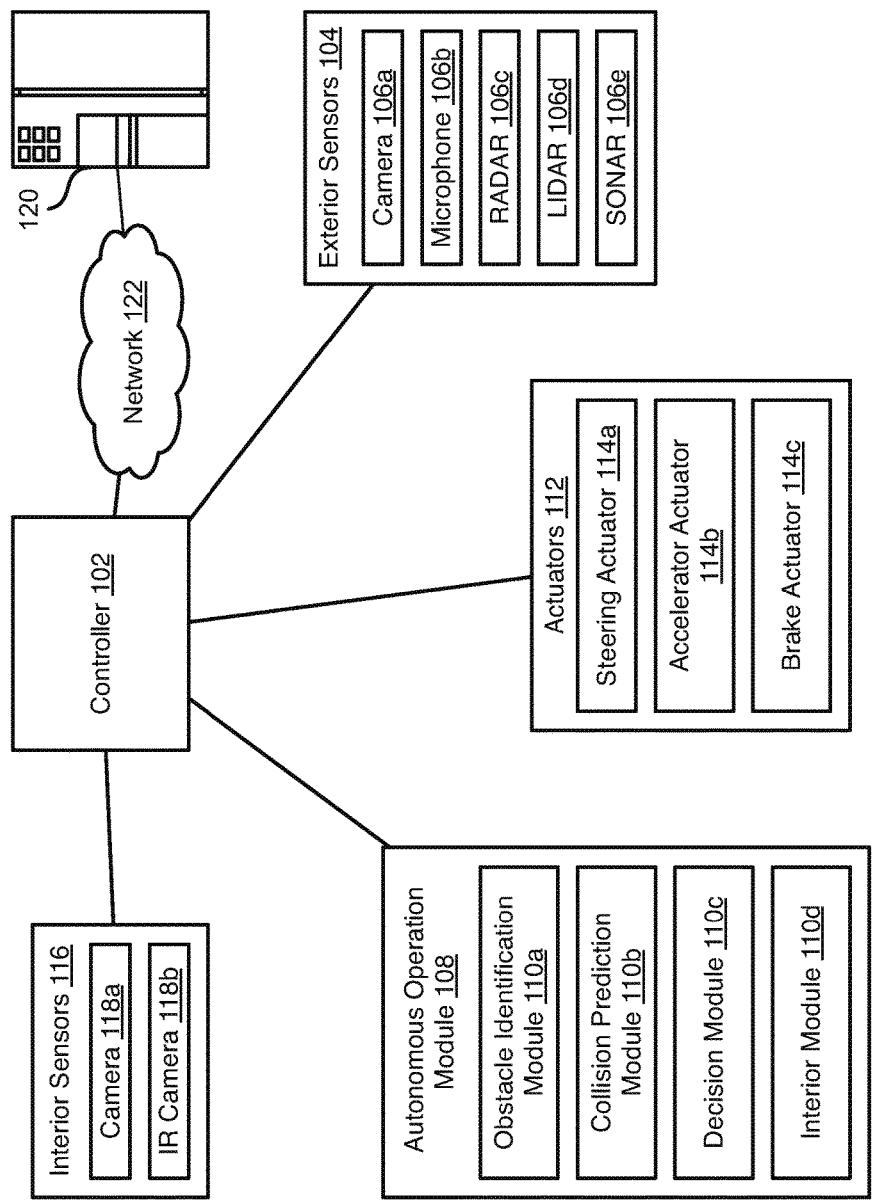
FIG. 1A is a schematic block diagram of a system for implementing embodiments of the invention.
Figure 1B:
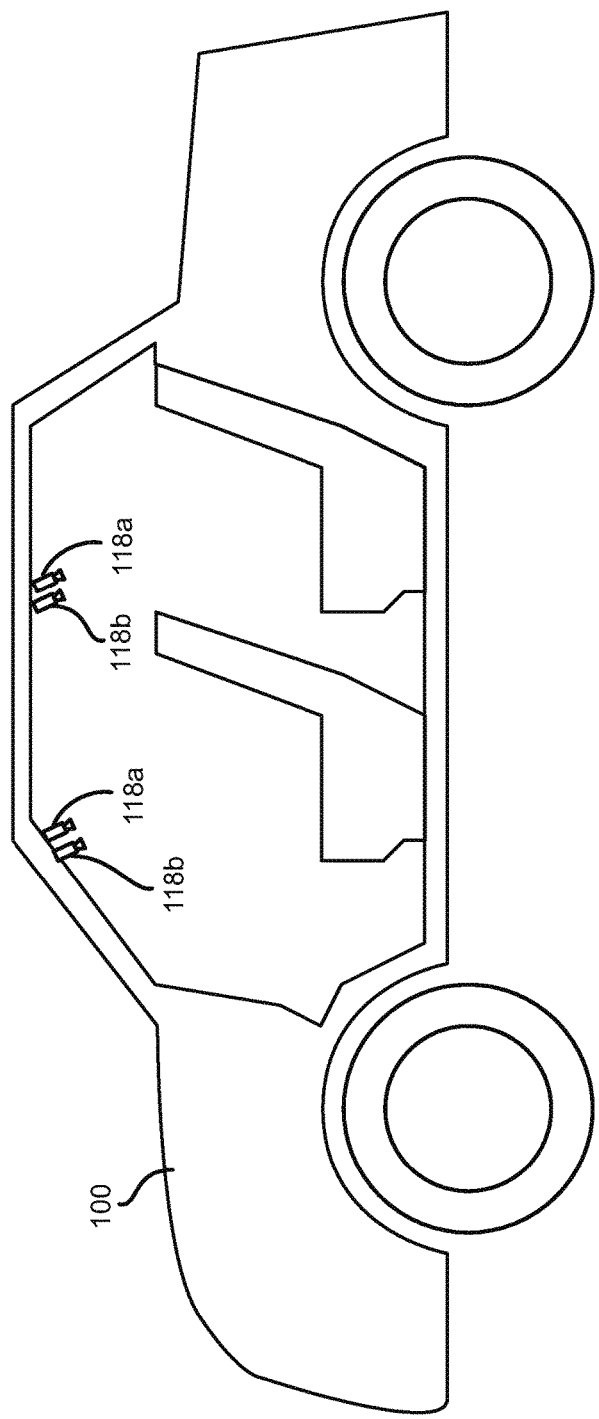
FIG. 1B is a schematic block diagram of a vehicle including interior sensors for implementing embodiments of the invention.

Referring to FIGS. 1A and 1B, a vehicle 100 (see FIG. 1B) may house a controller 102. The vehicle 100 may include any vehicle known in the art. The vehicle 100 may have all of the structures and features of any vehicle known in the art including, wheels, a drive train coupled to the wheels, an engine coupled to the drive train, a steering system, a braking system, and other systems known in the art to be included in a vehicle.

As discussed in greater detail herein, the controller 102 may perform autonomous navigation and collision avoidance. The controller 102 may receive one or more outputs from one or more exterior sensors 104. For example, one or more cameras 106a may be mounted to the vehicle 100 and output image streams received to the controller 102. The controller 102 may receive one or more audio streams from one or more microphones 106b. For example, one or more microphones 106b or microphone arrays 106b may be mounted to the vehicle 100 and output audio streams to the controller 102. The microphones 106b may include directional microphones having a sensitivity that varies with angle.

The exterior sensors 104 may include sensors such as RADAR (Radio Detection and Ranging) 106c, LIDAR (Light Detection and Ranging) 106d, SONAR (Sound Navigation and Ranging) 106e, and the like.

The controller 102 may execute an autonomous operation module 108 that receives the outputs of the exterior sensors 104. The autonomous operation module 108 may include an obstacle identification module 110a, a collision prediction module 110b, and a decision module 110c. The obstacle identification module 110a analyzes the outputs of the exterior sensors and identifies potential obstacles, including people, animals, vehicles, buildings, curbs, and other objects and structures. In particular, the obstacle identification module 110a may identify vehicle images in the sensor outputs.

The collision prediction module 110b predicts which obstacle images are likely to collide with the vehicle 100 based on its current trajectory or current intended path. The collision prediction module 110b may evaluate the likelihood of collision with objects identified by the obstacle identification module 110a. The decision module 110c may make a decision to stop, accelerate, turn, etc. in order to avoid obstacles. The manner in which the collision prediction module 110b predicts potential collisions and the manner in which the decision module 110c takes action to avoid potential collisions may be according to any method or system known in the art of autonomous vehicles.

The decision module 110c may control the trajectory of the vehicle by actuating one or more actuators 112 controlling the direction and speed of the vehicle 100. For example, the actuators 112 may include a steering actuator 114a, an accelerator actuator 114b, and a brake actuator 114c. The configuration of the actuators 114a-114c may be according to any implementation of such actuators known in the art of autonomous vehicles.

In embodiments disclosed herein, the autonomous operation module 108 may perform autonomous navigation to a specified location, autonomous parking, and other automated driving activities known in the art.

The autonomous operation module 108 may further include an interior module 110d that evaluates a state of the interior of the vehicle 100 according to the methods disclosed herein. The interior module 110d may evaluate outputs of one or more interior sensors 116. The interior sensors 116 may include one or more cameras 118a, i.e. a visible light camera such as a still image or video camera. The interior sensors 116 may also include one or more infrared (IR) cameras 118b. The interior sensors 116 may include any sensor known in the art such as an electro-chemical sensor, humidity sensor, or an electronic thermometer. For example, the interior module 110d may implement the techniques disclosed in U.S. application Ser. No. 15/343,726 filed Nov. 4, 2016 Nov. 4, 2016 and entitled "A System and Methods for Assessing the Interior of an Autonomous Vehicle", which is hereby incorporated herein in its entirety.

As shown in FIG. 1B, one or more cameras 118a may be positioned and oriented in the vehicle to have all seating surfaces (seat bottoms and seat backs) in the field of view of at least one of the cameras 118a. Other areas of the interior of the vehicle may also be in the field of at least one of the cameras 118a.

One or more IR cameras 118b may be positioned and oriented in the vehicle to have all seating surfaces (seat bottoms and seat backs) in the field of view of at least one of the IR cameras 118b. Other areas of the interior of the vehicle may also be in the field of at least one of the IR cameras 118b.

The controller 102 may be in data communication with a server 120, such as by means of a network 122 that may include any wired or wireless network connection, including a cellular data network connection. The methods disclosed herein may be implemented by the server 120, the controller 102, or a combination of the two.

Figure 2:
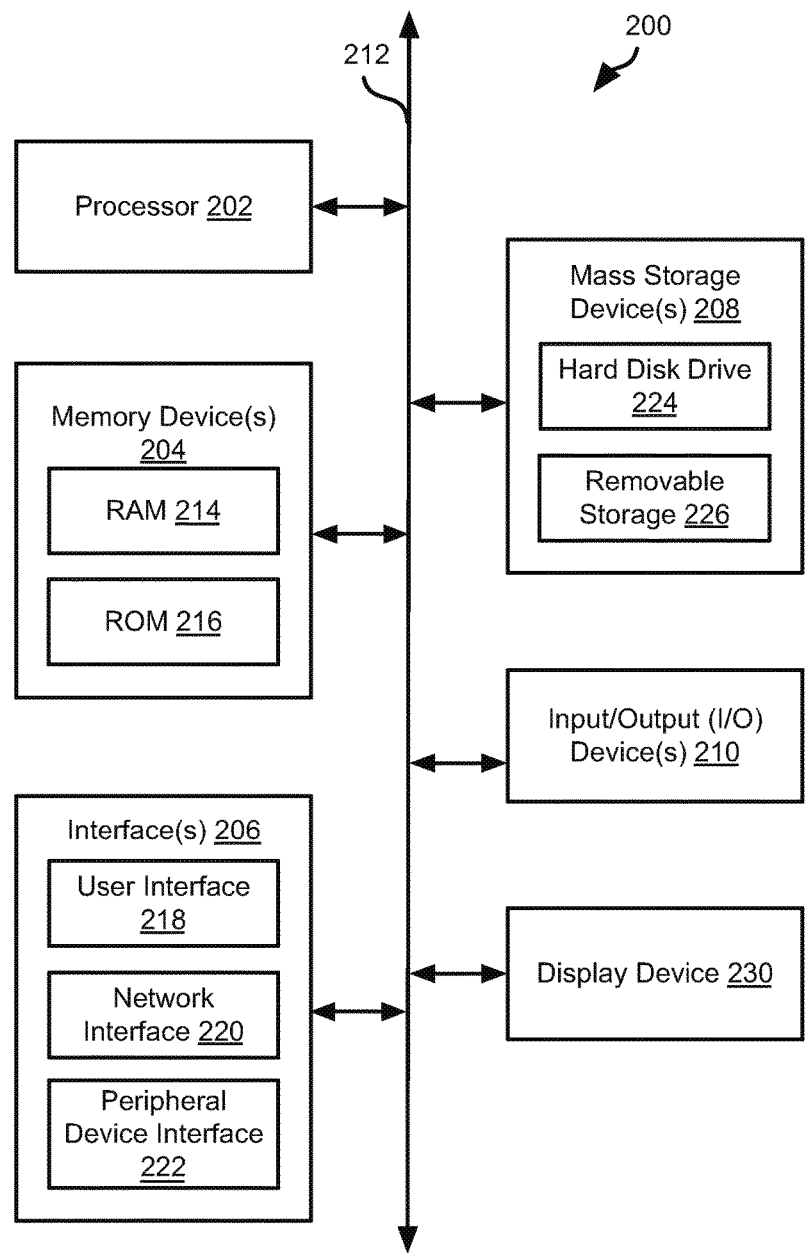
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The controller 102 and server system 120 may have some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
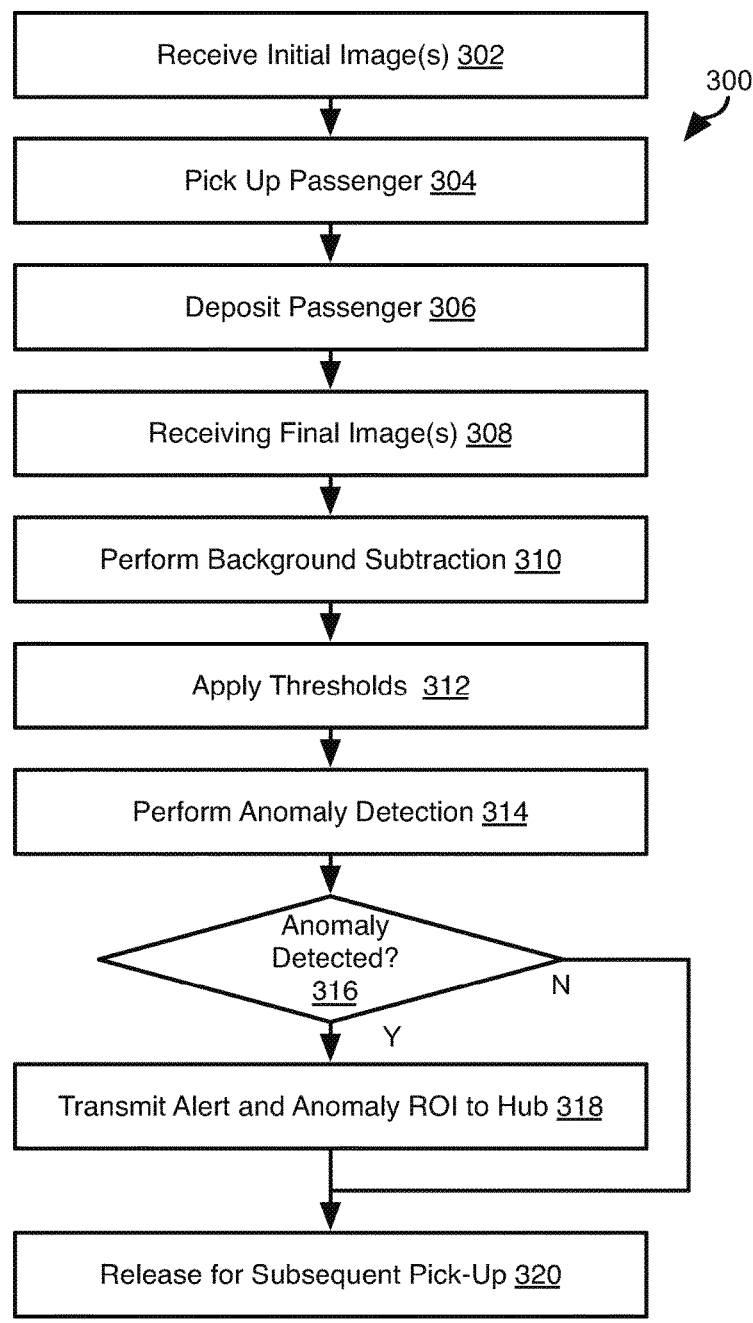
FIG. 3 is a process flow diagram of a method for evaluating a state of an autonomous taxi in accordance with an embodiment of the present invention.

Referring to FIG. 3, the illustrated method 300 may be used to obtain data from the interior sensors 116 in order to evaluate the condition of the interior of the vehicle 100. The method 300 may be performed by the controller 102, the server system 120, or be divided among these devices.

The method 300 may include receiving 302 one or more initial images of the interior of the vehicle using the one or more cameras 118a, one or more IR cameras 118b, or both one or more cameras 118a and one or more IR cameras 118b.

Step 302 may occur just prior to picking up one or more passengers at a trip, e.g. at a pick up location prior to the one or more passengers entering the vehicle, prior to departure from a dispatching area, at a cleaning station following cleaning or inspection, or after dropping of passengers from a preceding trip.

The one or more images of step 302 may be stored by the controller 102 and may additionally or alternatively be transmitted to the server system 120, which may store them in a trip data record.

The controller 100 may then pick up 304 one or more passengers, autonomously navigate to a destination, and deposit 306 the one or more passengers at the destination.

The method 300 may then include receiving 308 one or more final images of the interior of the vehicle using the one or more cameras 118a, one or more IR cameras 118b, or both one or more cameras 118a and one or more IR cameras 118b. Step 308 may be performed immediately after depositing 306 the one or more passengers. For example, in response to detecting closing of one or more doors of the vehicle 100 following stopping at the destination. The images received at step 308 may be stored by the controller 102 locally and may additionally or alternatively transmitted to the server system 120.

Figure 4A:
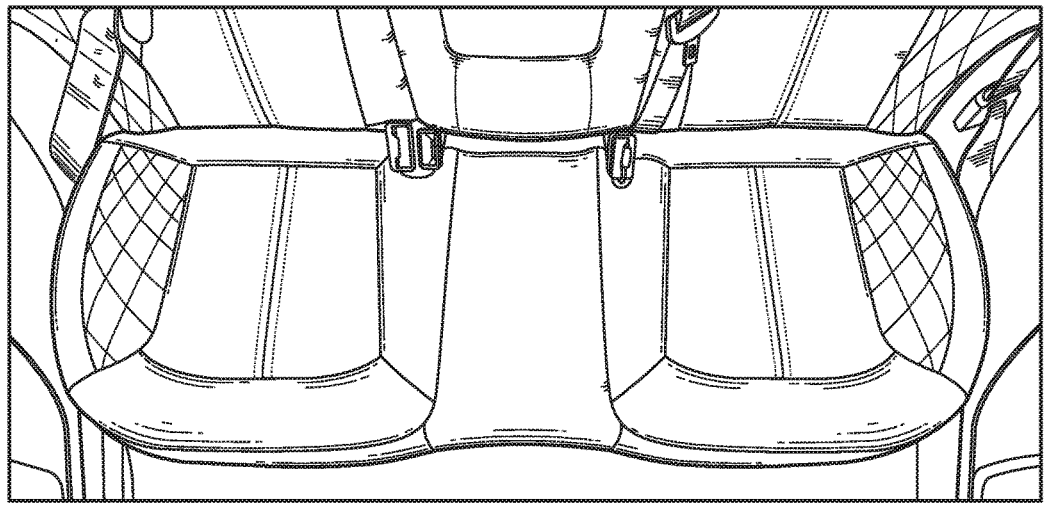
FIGS. 4A to 4D are images illustrating the identification of anomalies in the interior of a vehicle in accordance with an embodiment of the present invention.
Figure 4B:
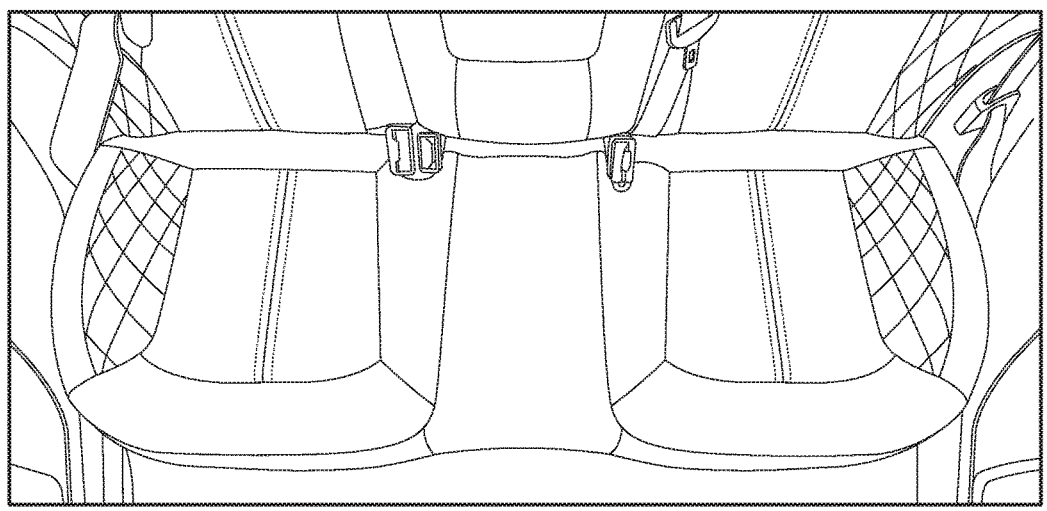
Figure 4C:
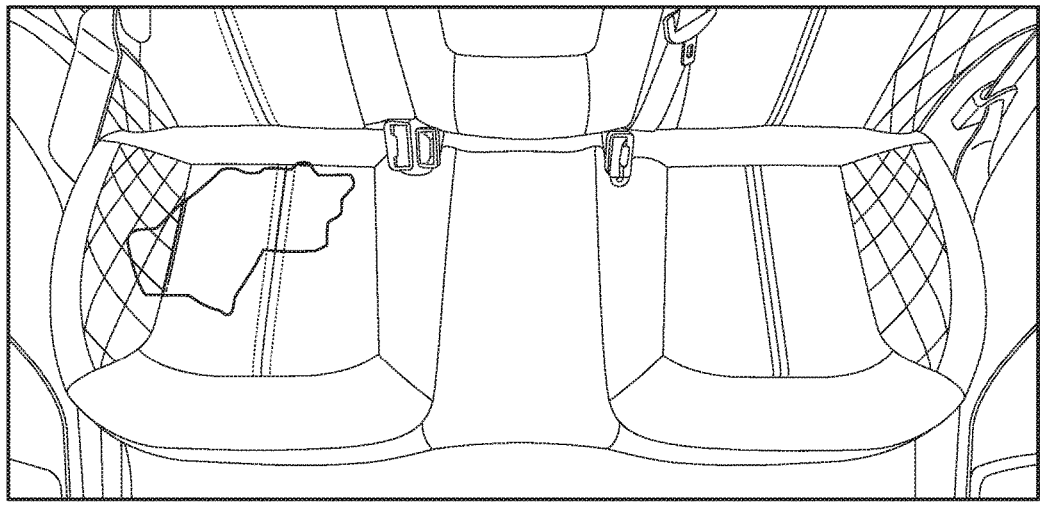
Figure 4D:
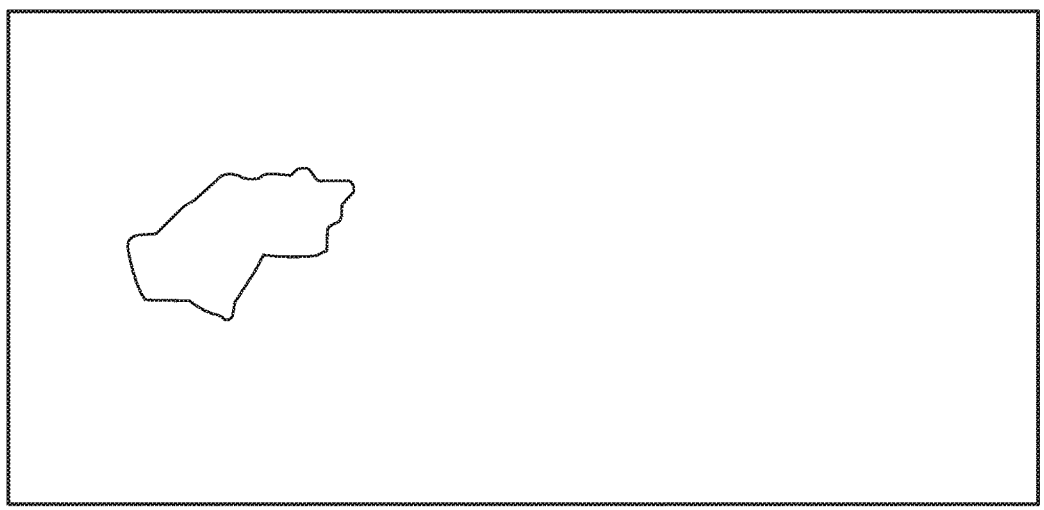

The method 300 may then include performing 310 background subtraction, e.g. subtracting an initial image of an area from a final image of the same area. For example, the method 300 may be performed with respect to a back seat of a vehicle as shown in the visible light image of FIG. 4A. An initial IR image is shown in FIG. 4B and a final IR image having a spill is shown in FIG. 4C. Inasmuch as a spill may be hot, e.g. spilled coffee, or cold, e.g. a cold drink or liquid cooled due to evaporation, spills will generally be particularly visible in the IR images. FIG. 4D illustrates a difference image from subtracting the pixel values of image 4B from the corresponding pixel values of image 4C, i.e. the pixel at a given position in the initial image may be subtracted from the pixel at that position in the final image to obtain a difference that is the pixel value at that position in the difference image.

The method 300 may include applying 312 one or more thresholds or applying other image processing techniques to highlight anomalies in the difference image. For example, pixels in the difference image having an intensity below a threshold may be removed. For example, where a pixel intensity is between 0 and 255, intensities above 40 in the difference image may be retained and evaluated further. The remaining pixels may then be grouped into clusters of contiguous pixels. The area occupied by each cluster may then be evaluated. Those clusters encompassed by an area below a size threshold may be removed from further consideration. Those clusters occupying an area greater than the size threshold may be processed further or identified as anomalies that may be a spilled liquid. In some embodiments, the size threshold is a relative size threshold, i.e. those clusters that are less than some percentage or other function of the size of the clusters in the image may be determined to be below the size threshold. Other processing techniques known in the art may be performed such as retinex processing or the like.

In some embodiment, anomaly detection of step 314 may include processing of both visible light and IR images. For example, a IR difference image may be calculated as a difference between initial and final (i.e., before and after passenger trip) IR images. A visible light difference image may be calculated as a difference between initial and final visible light images. Both of these difference images may be analyzed to determine whether an anomaly is present. For example, thresholding, clustering, and evaluating of cluster size may be performed for the visible light difference image in the same manner as described above. Accordingly, where anomalies are found in both the IR difference image and visible difference image, the likelihood of an anomaly being determined to be present will increase.

If an anomaly is detected 316 in the output of step 314, then the method 300 may include transmitting 318 an alert to a dispatcher. In some embodiments, the alert may include a portion of a visible image corresponding to each anomaly. For example, as shown in FIG. 4D, the white region indicates an anomaly. A corresponding region, e.g. bounding rectangle in a visible light image 4A of the same region may be transmitted with the alert, thereby enabling a dispatcher to verify whether or not a spill appears to be present. For example, the visible light image may be transmitted having the region corresponding to the anomaly highlighted, such as by means of a bounding rectangle superimposed on the image.

The dispatcher may then instruct the vehicle to proceed to a cleaning station or release 320 the vehicle to autonomously travel to a next pickup location, such as a pickup location received by the controller 102 from the server system 120. The controller 102 will then cause the vehicle to proceed to the location indicated by the dispatcher.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for a vehicle comprising:
an infrared (IR) camera sensing an interior of the vehicle;
a visible light camera operably coupled to the controller and having the interior of the vehicle in a field of view thereof;
a controller coupled to the IR camera and programmed to—
receive a first output of the IR camera;
receive a second output of the IR camera subsequent to the first output;
if a change between the first output and the second output indicates an anomaly, invoke a remedial action;
receive a third output of the visible light camera; and
if the change between the first output and the second output indicates the anomaly, (a) identify a region of interest (ROI) in the third output corresponding to the anomaly and (b) transmit the ROI to a dispatcher.

2. The system of claim 1, wherein the controller is further programmed to:
receive an input from the dispatcher;
if the input is an instruction to proceed to a cleaning station, autonomously drive the vehicle to the cleaning station.

3. The system of claim 2, wherein the controller is further programmed to:
if the input is an instruction to proceed to a next pickup location, autonomously drive the vehicle to the next pickup location.

4. The system of claim 1, wherein the controller is further programmed to:
receive a fourth output from the visible camera prior to the third output;
evaluate a combination of (a) a difference between the first output and the second output and (b) a difference of the fourth output and the third output; and
if the combination indicates the anomaly, invoke the remedial action.

5. A system for a vehicle comprising:
an infrared (IR) camera sensing an interior of the vehicle;
a visible light camera operably coupled to the controller and having the interior of the vehicle in a field of view thereof;
a controller coupled to the IR camera and programmed to—
receive a first output of the IR camera;
receive a second output of the IR camera subsequent to the first output;
if a change between the first output and the second output indicates an anomaly, invoke a remedial action;
wherein the controller is further programmed to capture the first output with the IR camera prior to pickup of a passenger and to capture the second output with the IR camera after drop-off of the passenger.

6. The system of claim 5, wherein the controller is further programmed to:
subtract the first output from the second output to obtain a difference image; and
evaluate the difference image to determine whether the first output and the second output indicate the anomaly.

7. The system of claim 6, wherein the controller is further programmed to:
identify pixels in the difference image that exceed a threshold; and
evaluate whether the pixels in the difference image that exceed the threshold indicate the anomaly.

8. The system of claim 6, wherein the controller is further programmed to:
identify pixels in the difference image that exceed a threshold; and
evaluate whether the pixels in the difference image that exceed the threshold indicate the anomaly.

9. The system of claim 6, wherein the controller is further programmed to:
identify pixels in the difference image that exceed a threshold to obtain above-threshold pixels;

identify clusters of contiguous above-threshold pixels; and if any of the clusters are larger than a threshold size, identify the clusters that are larger than the threshold size as anomalies.

10. A method comprising, by a controller of a vehicle:
receiving a first output of an IR camera having an interior of the vehicle in a field of view thereof;
receiving a second output of the IR camera subsequent to the first output;
determining that a change between the first output and the second output indicates an anomaly;
in response to determining that the change between the first output and the second output indicates the anomaly, invoking a remedial action;
receiving a third output from a visible light camera, a field of view of the visible light camera including the interior of the vehicle; and
in response to determining that the change between the first output and the second output indicates the anomaly, (a) identifying a region of interest (ROI) in the third output corresponding to the anomaly and (b) transmitting the ROI to a dispatcher.

11. The method of claim 10, further comprising:
receiving an input from the dispatcher including an instruction to proceed to a cleaning station; and
in response to the input, autonomously driving the vehicle to the cleaning station.

12. The method of claim 10, further comprising:
receiving an input from the dispatcher including an instruction to proceed to a next pickup location; and
in response to the input, autonomously driving the vehicle to the next pickup location.

13. The method of claim 10, further comprising:
receiving a fourth output from the visible camera prior to the third output;
evaluating a combination of a difference between the first output and the second output and a difference of the fourth output and the third output; and
determining that the combination indicates the anomaly.

14. A method comprising, by a controller of a vehicle:
receiving a first output of an IR camera having an interior of the vehicle in a field of view thereof;
receiving a second output of the IR camera subsequent to the first output;
determining that a change between the first output and the second output indicates an anomaly;
in response to determining that the change between the first output and the second output indicates the anomaly, invoking a remedial action; and
capturing the first output with the IR camera prior to pickup of a passenger and to capturing the second output with the IR camera after drop-off of the passenger.

15. The method of claim 14, further comprising:
subtracting the first output from the second output to obtain a difference image; and
evaluating the difference image to determine whether the first output and the second output indicate the anomaly.

16. The method of claim 15, further comprising:
identifying pixels in the difference image that exceed a threshold; and
evaluating whether the pixels in the difference image that exceed the threshold indicate the anomaly.

17. The method of claim 15, further comprising:
identifying pixels in the difference image that exceed a threshold; and
evaluating whether the pixels in the difference image that exceed the threshold indicate the anomaly.

18. The method of claim 15, further comprising:
identifying pixels in the difference image that exceed a threshold to obtain above-threshold pixels;
identifying clusters of contiguous above-threshold pixels; and
identifying clusters that are larger than the threshold size as anomalies.

* * * * *